Patented Apr. 4, 1944

2,345,985

UNITED STATES PATENT OFFICE 2,345,985

PRODUCTION OF TITANIUM OXIDE PIGMENTS

Robert M. McKinney, Roselle, and Henry M. Stark, Arden, Del., assignors to E. I. du Pont de Nemours & Company, Wilmington, Del., a corporation of Delaware No Drawing. Application November 29, 1938, Serial No. 242,922

14 Claims. (Cl. 23—202)

This invention relates to the production of titanium oxide pigments, and particularly to the production of pigment titanium oxide in substantially rutile crystalline state. More specifically, it relates to a process for producing rutile titanium oxide pigments from mineral acid solutions of titanium adapted, normally, to produce anatase titanium oxide.

Titanium oxide occurs in three crystalline states, i. e., anatase, brookite, and rutile, the respective refractive indices of which are 2.52, 2.64 and 2.71. Although rutile exhibits the highest refractive index and therefore the greatest potential hiding power value, commercial titanium oxide pigments are characteristically anatase in crystalline structure. Likewise, though rutile production processes are available and known, they have not been exploited commercially, principally because resort to relatively pure titanium chloride solutions is required, these being obtained from processes requiring chlorination of titaniferous ores at exceedingly high temperatures. Many difficulties are encountered in such processes, particularly those involving corrosion problems, and, as a consequence, such processes are extremely uneconomical and commercially unattractive for the production of rutile titanium oxide pigments on a wide scale.

Pigment-quality anatase titanium oxide is produced commercially by processes wherein titaniferous ores, such as ilmenite, rutile, brookite, or titaniferous iron ores, are dissolved through attack by relatively strong mineral acids, such as sulfuric or hydrofluoric acids. These acid solutions of titanium sulfate or fluoride, on purification and adjustment to suitable concentration, yield on hydrolysis anatase titanium oxide as a precipitate. This anatase precipitate is relatively insoluble in monobasic acids, such as hydrogen chloride or other halogen acids. Accordingly, it has been considered that anatase-producing processes are non-useful for the production of rutile titanium oxide pigments, especially since previously available processes for rutile production have been limited to the dissolution of anhydrous titanium chloride in water, following which such solution is hydrolyzed. It will thus be seen that provision of a commercially useful process wherein monobasic acid solutions can be readily employed to produce a rutile titanium oxide precipitate on hydrolysis, and which will not require use of difficult and uneconomical chlorination operations, is highly desirable.

It is among the objects of our invention, therefore, to provide a novel type of process for the production of rutile titanium oxide pigments, and particularly to effect such production from mineral acid solutions of titanium normally employed for producing anatase titanium oxide pigments. A further and particular object includes the provision of a process whereby precipitated titanium oxide in substantially rutile crystalline form is obtained from orthotitanic acid. Further objects and advantages of the invention will be apparent from the ensuing description.

These and other objects are accomplished in the present invention, which broadly comprises precipitating orthotitanic acid from mineral acid solutions of titanium commonly employed in the production of anatase titanium oxide, dissolving the resultant orthotitanic acid in a monobasic halogen-containing acid, particularly those normally employed in the production of rutile titanium oxide pigments, and then hydrolyzing the resultant monobasic acid titanium solution to obtain a rutile titanium oxide precipitate.

In a more specific embodiment, the invention comprises precipitating orthotitanic acid from titanium solutions of mineral acids from the group consisting of sulfuric and hydrofluoric acids, by treating said solutions with an alkali agent, dissolving said orthotitanic acid in a monobasic halogen acid, such as hydrochloric, hydrobromic, or hydriodic acids while maintaining not less than about 4 mols of the monobasic acid per mol of titanium, and then hydrolyzing the monobasic acid-titanium solution obtained to produce a rutile titanium oxide precipitate.

In a preferred and more specific embodiment, the invention comprises precipitating orthotitanic acid from a titanium sulfate solution by adding a sufficient quantity of alkali hydroxide thereto, washing the resultant orthotitanic acid precipitate to remove soluble salts therefrom, dissolving the purified precipitate in an inorganic monobasic acid, such as hydrochloric acid, utilizing not less than a ratio of 4 mols of acid per mol of titanium in the precipitate in effecting such dissolving, and then hydrolyzing the resultant solution to precipitate rutile titanium oxide.

In one adaptation of the invention, a mineral acid solution of titanium which on hydrolysis is adapted to produce precipitated anatase titanium oxide, is prepared by dissolving a titaniferous ore such as ilmenite or those mentioned, or any artificially prepared titanium-bearing materials or concentrates, in relatively strong sulfuric acid. From such dissolution a relatively dry sulfated reaction mass is obtained which, when dissolved in water or dilute acid, produces a relatively concentrated titanium sulfate solution. Reduction of such solution is then effected, whereby all of its iron content is converted to the ferrous condition. A sufficient quantity of an alkali agent, preferably ammonium or sodium hydroxide, is then added to the titanium sulfate solution, the amounts of agents so employed being sufficient to suitably adjust the pH value of said solution to substantial neutralization in order to induce precipitation of its titanium content as orthotitanic acid or hydrated titanium oxide. The precipitate thus obtained is washed free of ferrous solution or any other soluble salts introduced therein as a result of alkali treatment, and after such purification is dissolved in hydrochloric acid. In effecting such monobasic acid dissolution not less than about 4 mols of acid per mol of titanium present in the precipitate, and preferably from about 6 to 8 mols of acid per mol of titanium, are utilized. The resultant acid solution is then subjected to hydrolysis in accordance with conventional procedures, the disclosures of U. S. Patents 2,062,133 or 2,062,134 constituting desirable methods for such purpose. The hydrolysis precipitate comprises substantially rutile titanium oxide. This precipitate is separated from the acid hydrolysis liquor, washed out in the usual manner and then subjected to calcination, preferably in a rotary type of calciner. Temperatures ranging from above about 800° C. and to about 1100° C. are employed during said calcination, such temperatures preferably ranging from above 900° C. to about 1050° C. The calcined titanium oxide is then wet or dry milled in accordance with conventional methods, the finished pigment comprising relatively small, uniform particle size rutile titanium oxide of excellent pigmentary characteristics, especially in respect to hiding power, color, tinting strength and oil absorption values.

In order that the invention may be more clearly understood, the following specific and illustrative examples are given, none of which is to be considered as in limitation of the invention:

*Example I*

A solution of titanium sulfate obtained by dissolving ilmenite in strong $H_2SO_4$, and containing 40 grams of $TiO_2$ per liter was added to a tank containing dilute ammonium hydroxide solution until a pH of 7.0 was found. The resulting mixture was a suspension of orthotitanic acid (or titanium hydroxide) in ammonium sulfate. The solution was then removed by filtration and washing and sent to an ammonia recovery system wherein the ammonia was distilled out by boiling after treatment with lime. The gaseous ammonia was adsorbed in water and thus made ready for reuse in the precipitation of more titanium hydrate. The orthotitanic acid cake was continuously added to a titanium chloride solution while maintaining within the solution a molar ratio of titanium to chloride of about 1 to 6 through use of recovered hydrolysis acid having a strength of 18% HCl. The resulting solution was placed in an agitated batch hydrolysis tank which was equipped with an acid resisting steam coil and upon heating to the boiling temperature, where it was maintained for one hour, a satisfactory yield was obtained. The pigment was then separated from the acid and calcined to develop desired and proper pigment properties. The acid was reused in the preparation of more solution for the chloride hydrolysis. The pigment, upon examination, was found to consist of a high quality rutile, superior in hiding power to the best titanium oxide pigment now on the market.

*Example II*

A solution of titanium fluoride was prepared by the action of hydrofluoric acid on ground rutile ore. The solution was adjusted to a pH value of about 6.6 with ammonium hydroxide and the iron precipitated as sulfide by addition of a solution of ammonium sulfide. The solution was then filtered to remove all solids and upon analysis was found to contain the equivalent of 48 grams $TiO_2$ per liter. The titanium oxide contained therein was then precipitated upon the addition of more ammonia and the resulting orthotitanic acid was freed of the motor liquor by filtration and washing. The filter cake and 20% hydrochloric acid solution were continuously added to a dissolving tank while maintaining a temperature under 20° C. and about 5 mols of HCl per mol of $TiO_2$. A substantially clear solution of titanium chloride was thereby obtained. The solution was withdrawn to agitated batch hydrolysis tanks where it was heated to boiling by means of submerged steam coils. At the end of one hour of boiling a yield of 95% was found upon analysis of the acid liquor. The precipitated $TiO_2$ was removed by filtration and washing and subsequently calcined. X-ray and pigment tests disclosed it to be a high grade rutile pigment having hiding power and tinting strength .15% and 25% respectively better than is to be found in the best currently marketed titanium oxide pigment.

*Example III*

A solution of titanium sulfate obtained from the dissolution if ilmenite in strong sulfuric acid and containing 30 grams of $TiO_2$ per liter was added to a tank containing dilute ammonium hydroxide solution until a pH of 7.0 was reached. The resultant mixture comprised a suspension of orthotitanic acid in ammonium sulfate. The solution was then removed by filtration and washing and sent to an ammonia recovery system, wherein the ammonia was distilled out by boiling after treatment with lime. The gaseous ammonia was absorbed in water and thereby made ready for reuse in the precipitation of more titanium hydrate. The orthotitanic acid cake was continuously added to a 20% hydrochloric acid solution maintained at a temperature under about 20° C., the molar ratio of titanium to acid within such solution being about 1 to 6. The resultant solution containing about 50 grams $TiO_2$ per liter was placed in an agitated batch hydrolysis tank equipped with an acid-resistant steam coil, heated to boiling, and there maintained for one hour, a yield in excess of 95% $TiO_2$ being found on analysis to exist in the acid liquor. The precipitate was then separated from the acid mother liquor, subjected to washing, and then calcined to develop its pigment properties. The resultant product was found to consist of a high quality rutile titanium oxide, superior in hiding power and tinting strength to commercially available titanium oxide pigments.

It will be found that the conditions under which the orthotitanic acid is precipitated, filtered, washed and employed are material and critical to the procurance of optimum benefits under the invention. Thus, precipitation is desirably effected at temperatures not in excess of about 30° C. and preferably not higher than about 20° C. Usually such precipitation is most conveniently effected at a temperature of about 15° C., such temperatures being maintained throughout substantially the subsequent filtering and washing operations. The washed cake will be found to contain relatively large amounts of water and, as a consequence, the solution which is prepared by the addition of the monobasic acid will be somewhat dilute in character. Concentrations in excess of 50 or 60 grams of $TiO_2$ per liter are therefore preferably resorted to, concentrations in excess of such lower 50 g./l. figure being usually required at all times. Similarly, the amount of monobasic acid employed in such solution preparation is also important and critical to the obtainment of optimum benefits. As indicated, not less than about 4 mols of acid, and preferably not less than about 6 mols and up to about 8 mols or higher, per mol of titanium should be employed in effecting dissolving. Should the acid content run below the indicated lower limit, or should the $TiO_2$ content of the solution run below substantially 50 grams per liter, the quality of the resultant pigment product will be found to become undesirably affected. Further, as the ratio of acid to titanium decreases, it will be found that the amount of rutile present in the finished pigment will correspondingly decrease. Therefore, to insure the production of a high quality, 100% rutile $TiO_2$ precipitate, acid concentrations of from 6 to 8 mols of acid per mol of titanium will be found necessary. In the preferred adaptation of the invention, therefore, and to overcome the tendency of the precipitate to contain substantial and undesired amounts of anatase and avoid the possibility of the pigment product becoming poorer in hiding power, tinting strength, or color, or diminished in respect to other desired pigment values, resort to such higher ratios of monobasic acid to $TiO_2$ is accordingly recommended. Although the ratio of monobasic acid to titanium may, if desired, exceed the indicated upper ratio of 8 mols of acid to 1 of titanium, resort to ratios in excess thereof induces no additive or beneficial effects in the invention. Therefore, since the upper limit indicated insures the production of a 100% rutile titanium oxide precipitate, and higher ratios would merely prove uneconomical, resort to ratios in excess of the indicated limit is therefore unnecessary. As a further precaution against the production of a hydrolysis product containing substantial amounts of anatase and to insure the production of one consisting substantially completely of rutile, the titanium solution, when prepared from orthotitanic acid, should be not less than 3 normal and preferably not less than 4 normal in the monobasic acid, and in addition, be substantially free of polybasic acids.

The above examples disclose operations in which titanium solutions are prepared from orthotitanic acid and subsequently hydrolyzed to produce products which, upon calcination, exhibit pigment properties equal to or superior over the products from normal anatase-producing operations. These results are not obtainable through the hydrolysis of titanium solutions prepared from orthotitanic acid and monobasic halogen-containing acids in other ways. As indicated, in certain of the examples the precipitated titanium compound, if desired, may be added as a filter cake to a titanium solution such as titanium chloride, rather than to strongly acid solutions, and this may be readily had by effecting such step in a relatively continuous manner. This comprises a particularly advantageous and desirable method of adapting the invention, since by so operating the resulting solutions appear freer of associated or colloidal titanium material, which, if present in appreciable quantities, undesirably interferes with the production of a rutile precipitate during thermal hydrolysis. The conditions of continuous dissolving may be approached by semi-continuous dissolution, and such mode of operation is accordingly considered as within the scope of the invention. In any dissolving procedure not strictly continuous, and wherein the orthotitanic acid cake and the monobasic halogen-containing acid are not added in a substantially simultaneous manner, it will be found desirable and advantageous to effect dissolution in such manner that not less than about 90% of the cake is dissolved in the titanium solution in which the dissolving solution contains not less than 5 grams of $TiO_2$ per liter.

Although specific alkali agents, such as ammonium and sodium hydroxide, have been mentioned herein as utilizable in the invention for precipitating orthotitanic acid from titanium sulfate or fluoride solutions, the use of alkalies generally is contemplated for the purpose. Thus, the hydroxides and carbonates of ammonia, as well as those of the monovalent alkali metals, lithium, sodium, potassium, rubidium or cesium, may also be employed. For convenience, we generically designate these useful compounds, here and in the appended claims, as "alkaline reagents." Obviously, any desired amount of alkaline reagent and sufficient to effect precipitation of the orthotitanic acid may be utilized in the invention; and in the employment of such reagent, the titanium solution may be added to a solution of the alkali, or vice versa. Generally, precipitation of orthotitanic acid is effected when neutralization is reached. Therefore, and as indicated, employment in the invention of an amount of alkali sufficient to induce neutralization will, for all practical purposes, ordinarily suffice. For most practical operations, titanium precipitation will be found to occur within a pH range of from 4 to about 8, a convenient and preferred operative range, however, consisting of from 4 to 7 pH.

In the above disclosure, we have specified that the washing and filtration conditions are critical. The orthotitanic acid must be purified or washed until it is substantially free of salts of the acid which was used in the preparation of the solution from the ore. Anatase rather than rutile is produced if this requirement is not met and the objects of this invention are not had in that event.

Similarly, although the invention has been described in its preferred adaptation wherein hydrochloric acid has been employed, other monobasic halogen-containing acids in lieu of hydrochloric acid may also be utilized in the invention for effecting dissolution of the orthotitanic acid precipitate. Thus, other employable halogen acids include hydrobromic, hydriodic, perchloric or perbromic acids, as well as such halogen-containing organic acids, as tri-, di-, or chloracetic acids, etc.

It will be understood that by the term "orthotitanic acid," as here used and in the appended claims, we refer to that relatively gelatinous type of precipitate which is obtained upon addition of an alkaline reagent to a tetravalent titanium salt solution.

We claim as our invention:

1. A process for the preparation of rutile titanium oxide pigments from polybasic mineral acid solutions obtained from titanium-bearing materials and which solutions produce anatase titanium oxide normally on hyrolysis, comprising precipitating at a temperature not in excess of substantially 30° C. orthotitanic acid from said solutions by mixing the same with an alkaline reagent, purifying said orthotitanic acid to render the same substantially free of salts of said mineral acid, dissolving the purified precipitated titanium compound in a monobasic halogen-containing acid, during said dissolving operation maintaining a ratio of at least 4 mols of acid per mol of titanium in the monobasic halogen-containing acid hydrolyzing the resultant solution while substantially free from polybasic acids to obtain a titanium oxide precipitate comprising rutile, during hydrolysis of said solution maintaining a $TiO_2$ concentration in excess of 50 g./l. and then calcining said precipitate to develop its pigment properties.

2. A process for the preparation of rutile titanium oxide pigments from titanium sulfate solutions obtained from sulfuric acid dissolution of titaniferous ores, comprising precipitating at a temperature not in excess of substantially 30° C. orthotitanic acid from said solutions by mixing the same with an alkaline reagent, subjecting the precipitated titanium compound to purification, to render the same substantially free of salts of said sulfuric acid dissolving the purified titanium compound in a monobasic halogen-containing acid, during said dissolving operation maintaining a ratio of at least 4 mols of acid per mol of titanium in the monobasic halogen-containing acid subjecting the resultant monobasic acid solution while substantially free from polybasic acids to hydrolysis, and then calcining the precipitate, comprising rutile titanium oxide, thus obtained.

3. A process for the preparation of rutile titanium oxide pigments from titanium sulfate solutions obtained from sulfuric acid dissolution of titaniferous ores, comprising precipitating at a temperature not in excess of substantially 30° C. orthotitanic acid from said solutions by mixing the same with an alkaline reagent, subjecting the precipitated titanium compound to purification to render the same substantially free of salts of said sulfuric acid, dissolving the purified titanium compound in hydrochloric acid, during said dissolving operation maintaining a ratio of at least 4 mols of HCl per mol of titanium subjecting the resultant hydrochloric acid solution while substantially free from polybasic acids to hydrolysis, during said hydrolysis maintaining a $TiO_2$ concentration in the solution in excess of 50 g./l., and then calcining the precipitate, comprising rutile titanium oxide, thus obtained.

4. A process for producing rutile titanium oxide pigments from polybasic mineral acid solutions of titanium normally employed in the production of anatase titanium oxide, comprising mixing said solutions with an inorganic alkali compound to precipitate therefrom orthotitanic acid, effecting said precipitation at temperatures not in excess of substantially 20° C., dissolving the resultant precipitate after purification treatment to render said precipitate substantially free of salts of said mineral acid in a monobasic halogen-containing acid, during such dissolution maintaining a ratio of at least 4 mols of acid to each mol of titanium, while maintaining a $TiO_2$ concentration in excess of 50 g./l. hydrolyzing the resultant monobasic acid solution while substantially free from a polybasic acid to obtain a substantially rutile titanium oxide precipitate, and then calcining said precipitate to develop its pigment properties.

5. A process for the production of rutile titanium oxide pigments from polybasic mineral acid solutions of titanium which on hydrolysis normally produce anatase titanium oxide, comprising precipitating or thotitanic acid from said solutions by mixing the same with an inoragnic alkali compound, effecting said precipitation at temperatures not in excess of substantially 20° C., subjecting said orthotitanic acid precipitate to purification to render said orthotitanic acid substantially free of salts of said mineral acid, dissolving the purified precipitate in a monobasic, halogen-containing acid, maintaining a ratio of from 6 to 8 mols of acid per mol of titanium during such dissolution, while maintaining a $TiO_2$ concentration in excess of 50 g./l. hydrolyzing the resultant monobasic acid solution while substantially free from a polybasic acid to precipitate substantially rutile titanium oxide, and then calcining said precipitate to develop its pigment properties.

6. A process for the preparation of rutile titanium oxide pigments from titanium fluoride solutions obtained from titaniferous ore dissolution, comprising precipitating orthotitanic acid from said solutions by mixing the same with an alkaline reagent, effecting said precipitation at temperatures not in excess of substantially 20° C., subjecting the precipitated titanium compound to purification to render said compound substantially free of soluble salts, dissolving the resultant purified titanium compound in a monobasic, halogen-containing acid, during said dissolving maintaining a ratio of at least 4 mols of acid per mol of titanium, while maintaining a $TiO_2$ concentration in excess of 50 g./l., hydrolyzing the resultant monobasic acid solution while substantially free from a polybasic acid, and then calcining the precipitate, comprising rutile titanium oxide.

7. A process for the preparation of rutile titanium oxide pigments from titanium fluoride solutions obtained from titaniferous ore dissolution, comprising precipitating orthotitanic acid from said solutions by mixing the same with an alkaline reagent, effecting said precipitation at temperatures not in excess of substantially 20° C., subjecting the precipitated titanium compound to purification to render said compound substantially free of soluble salts, dissolving the resultant purified titanium compound in hydrochloric acid, during said dissolving maintaining a ratio of at least 4 mols of acid per mol of titanium, while maintaining a $TiO_2$ concentration in excess of 50 g./l., hydrolyzing the resultant monobasic acid solution while substantially free from a polybasic acid, and then calcining the precipitate, comprising rutile titanium oxide.

8. A process for producing rutile titanium oxide pigments from polybasic mineral acid solutions of titanium normally employed in the production of anatase titanium oxide, comprising mixing said solutions with an inorganic alkali compound to precipitate therefrom orthotitanic acid, effecting said precipitation at temperatures not in excess of substantially 20° C., dissolving the resultant precipitate after purification treatment to render said precipitate substantially free from salts of said mineral acid in hydrochloric acid, during such dissolution maintaining a ratio of at least 4 mols of acid to each mol of titanium, maintaining a $TiO_2$ concentration in excess of 50 g./l. and hydrolyzing the resultant hydrochloric acid solution while substantially free from polybasic acid to obtain a substantially rutile titanium oxide precipitate, and then calcining said precipitate to develop its pigment properties.

9. A process for producing rutile titanium oxide pigments from titanium sulfate solutions, comprising mixing said solutions with an alkali hydroxide to precipitate therefrom orthotitanic acid, effecting said precipitation at temperatures not in excess of substantially 20° C., dissolving the resultant precipitate in a monobasic, halogen-containing acid after said precipitate has been purified to render the same substantially free of soluble salts, during such dissolution maintaining an acid concentration of at least 4 mols of acid to each mol of titanium, maintaining a $TiO_2$ concentration in excess of 50 g./l. and hydrolyzing the resultant monobasic acid solution while substantially free of a polybasic acid to obtain a substantially rutile titanium oxide precipitate, and then subjecting said precipitate to calcination to develop its pigment properties.

10. A process for producing rutile titanium oxide pigments from titanium fluoride solutions, comprising mixing said solutions with an alkali hydroxide to precipitate therefrom orthotitanic acid, effecting said precipitation at temperatures not in excess of substantially 20° C., dissolving the resultant precipitate after purification treatment to render said precipitate substantially free of soluble salts in a monobasic, halogen-containing acid, during such dissolution maintaining an acid concentration of at least 4 mols of acid to 1 mol of titanium, maintaining a $TiO_2$ concentration in excess of 50 g./l. and hydrolyzing the resultant while substantially free of a polybasic acid solution to obtain a substantially rutile titanium oxide precipitate, and then subjecting said precipitate to calcination to develop its pigment properties.

11. A process for the production of rutile titanium oxide pigments from titanium sulfate solutions, comprising precipitating orthotitanic acid from said solutions by mixing the same with alkali hydroxide, effecting said precipitation at a temperature of about 15° C. subjecting said orthotitanic acid precipitate to purification to render said precipitate substantially free of soluble salts, dissolving the purified precipitate in hydrochloric acid while maintaining a ratio of from 6 to 8 mols of acid per mol of titanium, maintaining a $TiO_2$ concentration in excess of 50 g./l. and hydrolyzing the resultant acid solution while substantially free from a polybasic acid to precipitate substantially rutile titanium oxide, and then calcining said precipitate to develop its pigment properties.

12. A process for the production of rutile titanium oxide pigments from titanium fluoride solutions, comprising precipitating orthotitanic acid from said solutions by mixing the same with alkali hydroxide, effecting said precipitation at a temperature of about 15° C. subjecting said orthotitanic acid precipitate to purification to render said precipitate substantially free of soluble salts, dissolving the purified precipitate in hydrochloric acid while maintaining a ratio of from 6 to 8 mols of acid per mol of titanium, maintaining a $TiO_2$ concentration in excess of 50 g./l. and hydrolyzing the resultant acid solution while substantially free from polybasic acid to precipitate titanium oxide in substantially rutile form, and then calcining said rutile titanium oxide precipitate to develop its pigment properties.

13. A process for the preparation of rutile titanium oxide pigments from polybasic mineral acid solutions obtained from titanium-bearing materials and which solutions on hydrolysis normally produce anatase titanium oxide, comprising precipitating orthotitanic acid from said solutions by adding alkaline reagent thereto, effecting said precipitation at a temperature not in excess of substantially 20° C. dissolving the resultant precipitate after purification treatment to render said precipitate substantially free of salts of said mineral acid in an inorganic compound from the group consisting of a monobasic halogen-containing acid and the titanium salt thereof, during said dissolving maintaining in the dissolving liquor a ratio of at least 4 mols of acid per mol of titanium, while maintaining a $TiO_2$ concentration in excess of 50 g./l. hydrolyzing the resultant solution while substantially free from a polybasic acid to obtain a substantially rutile titanium oxide precipitate, and then calcining said precipitate to develop its pigment properties.

14. A process for producing rutile titanium oxide pigments from polybasic mineral acid solutions obtained from titanium-bearing materials which normally produce anatase titanium oxide on hydrolysis, comprising precipitating orthotitanic acid from said solutions by mixing an inorganic alkali compound therewith in an amount sufficient to provide a pH value in said solution of from about 4 to 8, during said precipitation maintaining said solution at a temperature not in excess of substantially 30° C., purifying the resultant orthotitanic acid precipitate to render said precipitate substantially free of soluble salts, and maintaining the same substantially free of polybasic acids, dissolving the purified precipitate in an amount of monobasic, halogen-containing acid sufficient to provide a ratio of acid to titanium of not less than 4 mols of acid per mol of titanium, maintaining a $TiO_2$ concentration in excess of 50 g./l. and hydrolyzing the resulting monobasic acid solution while substantially free from a polybasic acid to precipitate rutile titanium oxide, and then calcining said precipitate to develop its pigment properties.

ROBERT M. McKINNEY.
HENRY M. STARK.

CERTIFICATE OF CORRECTION.

Patent No. 2,345,985.  April 4, 1944.

ROBERT M. McKINNEY, ET AL.

It is hereby certified that error appears in the printed specification of the above numbered patent requiring correction as follows: Page 2, second column, line 21, Example II, for "motor" read --mother--; line 42, Example III, for "dissolution if" read --dissolution of--; page 4, first column, line 46, claim 2, before "and" insert --during hydrolysis of said solution maintaining a $TiO_2$ concentration in excess of 50 g/l--; and second column, line 16, claim 5, for "or thotitanic" read --orthotitanic--; page 5, first column, line 44, claim 10, after "resultant" insert --solution--; line 45-46, strike out "solution"; and that the said Letters Patent should be read with this correction therein that the same may conform to the record of the case in the Patent Office.

Signed and sealed this 6th day of June, A. D. 1944.

Leslie Frazer (Seal)  Acting Commissioner of Patents.